3,763,203
ROUTE TO ORGANO (TRIFLUOROMETHYL) MERCURY COMPOUNDS

Dietmar Seyferth, Lexington, and Steven P. Hopper, Cambridge, Mass., assignors to Massachusetts Institute of Technology, Cambridge, Mass.
No Drawing. Filed Jan. 10, 1972, Ser. No. 216,730
Int. Cl. C07f 3/10, 3/12
U.S. Cl. 260—431       8 Claims

ABSTRACT OF THE DISCLOSURE

Organo (trifluoromethyl) mercury compounds are formed by reacting a trifluoromethylmercuric salt and a diorganomercury compound. Organo (trifluoromethyl) mercury compounds serve as difluorocarbene donors for the preparation of gem difluorocyclopropanes.

---

The invention herein described was made in the performance of work sponsored by the United States Government under a contract with the Air Force Office of Scientific Research.

This invention relates to a method of forming organo-(trifluoromethyl) mercury compounds. In particular, the invention relates to an improved preparation of organo (trifluoromethyl) mercury compounds from readily available starting materials.

Organo (trihalomethyl) mercury compounds, particularly phenyl (trihalomethyl) mercury compounds, are highly effective for forming dihalocarbene in situ. This characteristic permits their reaction with base sensitive and/or weakly nucleophilic olefins to form the respective gem-dihalocyclopropanes. The gem-dihalocyclopropanes thus produced have many uses. For example, the gem-dihalocyclopropanes formed from ketene acetals are readily pyrolyzed to alfa-organoacrylic esters in the manner shown in the Journal of American Chemical Society, volume 81, pages 2579 (1959). In particular difluorocarbene sources have found extensive use in the formation of anti-inflammatory steroids as described in U.S. Pat. No. 3,492,318.

Present processes for forming phenyl (trifluoromethyl) mercury, a preferred difluorocarbene donor, involve the use of phenyl mercuric fluoride and phenyl (tribromomethyl) mercury reactants. However, these latter two compounds are difficult to produce and render these processes undesirable.

Recently, it has been discovered that trifluoromethyl mercuric iodide is a good source of difluorocarbene when reacted with sodium iodide and that gem-difluorocyclopropanes can be produced easily therefrom. This process is described more fully in an application filed concurrently herewith in the names of Dietmar Seyferth and Steven P. Hopper and entitled Process for Forming Difluorocarbene and Gem-Difluorocyclopropanes from Trifluoromethyl-Mercurials.

While trifluoromethyl mercuric iodide is a good source of difluorocarbene, its use is disadvantageous somewhat since it is relatively light unstable and is not completely storage stable. Therefore, it is necessary to use the iodide relatively soon after formation or to provide special storage conditions which may be expensive. Therefore, it would be highly desirable to provide a process for preparing phenyl (trifluoromethyl) mercury which eliminates the need for preparing phenyl mercuric fluoride or phenyl (tribromomethyl) mercury. Furthermore, it would be desirable to provide such a process which can be employed to produce a wide variety of organo (trifluoromethyl) mercury compounds.

The present invention is based on the discovery that trifluoromethylmercurials react with diorganomercurials to produce organo (trifluoromethyl) mercurials. The new synthesis is illustrated by the following equation:

$$CF_3HgX + R_2Hg \rightarrow RHgCF_3 + RHgX$$

In the above reaction R is an organo radical including a substituted or unsubstituted alkyl, or aryl including phenyl, naphthyl, diphenyl, condensed aromatic such as phenanthryl, anthryl, or the like which can be substituted as for example with halogen or alkyl. X is an inorganic radical such as a halogen, $RCOO^-$, sulfate, nitrate, or $O_2CCF_3$. Di(trifluoromethyl) mercury of the formula $(CF_3)_2Hg$ is also suitable for the above reaction rather than the $CF_3HgX$ compound.

The trifluoromethylmercurials useful in the present synthesis can be prepared by the reaction of trifluoromethylmercuric salt such as trifluoromethylmercuric trifluoroacetate with NaI in a manner more fully detailed in an application entitled Method for Forming Trifluoromethylmercury Compounds in the names of Dietmar Seyferth and Steven P. Hopper and filed concurrently herewith.

The reaction is carried out at an elevated temperature suitable to effect reaction but without decomposing the product of between about 50° C. and 150° C., preferably between about 80° C. and 85° C. in solvents inert to the reactants. Suitable solvents include aromatics such as benzene, toluene, xylene or the like; alkanes such as hexanes, heptanes, octanes, decanes, dodecanes, pentadecanes, octadecanes, eicosanes and the like; cyclohexane ethers such as diethyl ether or petroleum ether, kerosene or the like.

Reaction is complete usually within about 3 to 24 hours. During reaction, an inert atmosphere, such as a nitrogen atmosphere, preferably is maintained. The product is recovered as a solid such as by evaporation of the filtered reaction mixture to dryness and is purified in any conventional manner such as by recrystallization.

The organo (trifluoromethyl) mercurials produced in accordance with the present invention, may be used to prepare difluorocarbene by reaction with sodium iodide. In the presence of an olefin, the resulting difluorocarbene produced forms gem-difluorocyclopropanes in high yield. These reactions are described in a patent application entitled Preparation of Difluorocarbene and Gem-Difluorocyclopropanes in the names of Dietmar Seyferth and Steven P. Hopper and filed concurrently herewith. The new synthesis may be best illustrated by the following examples.

EXAMPLE I

This example illustrates a preferred preparation of phenyl (trifluoromethyl) mercury. In a 100 ml. round bottom 3-neck flask, 5.15 g. (15.5 mmoles) trifluoromethylmercuric iodide was treated with an equimolar quantity, 5.31 g. (15.0 mmoles) of diphenyl mercury in benzene (50 ml.) solution (3 hours at reflux, under nitrogen to provide an inert atmosphere). Phenylmercuric iodide precipitated and was removed by filtration with a fritted glass Buchner funnel. The benzene solution was evaporated with a rotary evaporator and the residue crystallized from boiling hexane to give phenyl (trifluoromethyl) mercury, M.P. 141–143° (pure by TLC), in 75% yield, 3.0 g.

EXAMPLE II

This example illustrates the preparation of phenyl (trifluoromethyl) mercury, this time starting with trifluoromethylmercuric trifluoroacetate and utilizing the basic method of Example I. Trifluoromethylmercuric trifluoroacetate 8.4 g. (22 mmoles) was reacted with 7.1 g. (20 mmoles) diphenylmercury in 60 ml. of benzene.

The products were separated by column chromatography. (Silicic acid, $CH_2Cl_2$ eluent) and the isolated yields of pure phenyl (trifluoromethyl) mercury were about 50–60% or 4.15 g. (60%).

EXAMPLE III

The reaction of Example I was repeated but with trifluoromethyl mercuric chloride or trifluoromethylmercuric bromide being substituted for trifluoromethylmercuric iodide to obtain phenyl (trifluoromethyl) mercury.

We claim:
1. A process for forming a compound of the formula:

$$RHgCF_3$$

which comprises reacting at an elevated temperature a trifluoromethylmercurial of the formula:

$$(CF_3)HgX$$

and a diorgano mercurial of the formula:

$$R_2Hg$$

wherein X is a radical selected from the group consisting of halogen, RCOO, sulfate, nitrate, $O_2CCF_3$, and trifluoromethyl and R is selected from the group consisting of alkyl, substituted alkyl, aryl, and substituted aryl.

2. A process according to claim 1 wherein the diorgano-mercurial is a diarylmercurial.

3. A process according to claim 1 wherein the diorgano-mercurial is a dialkylmercurial.

4. A process according to claim 1 wherein the trifluoromethylmercurial is $CF_3HgI$.

5. A process according to claim 1 wherein the trifluoromethylmercurial is $CF_3HgO_2CCF_3$.

6. A process according to claim 2 wherein R is phenyl and X is iodo.

7. The process according to claim 1 wherein the trifluoromethylmercurial is $CF_3HgCl$.

8. The process according to claim 1 wherein the trifluoromethylmercurial is $CF_3HgBr$.

References Cited

UNITED STATES PATENTS 3,658,861    4/1972    Seyferth et al. _____ 260—433

OTHER REFERENCES

Seyferth et al., J. Organometal-Chem., vol. 26, pp. C62–C64 (1971).

DANIEL E. WYMAN, Primary Examiner

A. P. DEMERS, Assistant Examiner

U.S. Cl. X.R.

260—433, 648 D